Aug. 15, 1961  L. A. BOTKIN  2,996,222
AIRPORT HYDRANT SYSTEM
Filed Dec. 23, 1959

INVENTOR.
LAWRENCE A. BOTKIN
BY Toulmin & Toulmin
ATTORNEYS

United States Patent Office 2,996,222
Patented Aug. 15, 1961

2,996,222
AIRPORT HYDRANT SYSTEM
Lawrence A. Botkin, Dayton, Ohio, assignor to Buckeye Iron & Brass Works, Dayton, Ohio, a corporation of Ohio
Filed Dec. 23, 1959, Ser. No. 861,501
8 Claims. (Cl. 222—67)

This invention relates to fuel handling systems and is particularly concerned with an aircraft refueling system in which a plurality of hydrants are supplied from a central source.

In most aircraft installations of large size means are provided for fueling aircraft at various locations within the port. Such systems usually take the form of a central bulk supply reservoir of substantial size from which fluid is pumped to a system of rigid pipes or conduits leading to hydrants distributed over the port.

Aircraft are then fueled by connecting a dispensing hose to a hydrant and in turn connecting the hose to the valve on the fuel tank of the aircraft. Then opening and closing of the valve or nozzle on the hose controls the fuel supply to the aircraft. A number of disadvantages obtain with a system of this nature including rather high original system cost and hazard of operation. In particular the hazard in connection with the operation is undesirable and this comes about on account of extremely high surge pressures which can be developed in the long rigid pipe lines leading from the main pump to the hydrants.

Such pressures can be developed, for example, when a fuel tank in an aircraft is filled and the nozzle is closed and at that time all the kinetic energy of the fuel which is in motion in the system must be dissipated substantially instantaneously leading to the development of the high pressures referred to.

With the foregoing in mind, it is a primary object of the present invention to provide an improved airport hydrant system for refueling aircraft.

Still another object of this invention is the provision of an improved airport hydrant system for the refueling of aircraft in which dangerous surges of pressure within the system are substantially reduced to well within safe limits.

Still another object of this invention is the provision of an airport hydrant system for refueling aircraft in which pressure surges in the fuel being supplied directly to the tank or container being filled are substantially completely eliminated thereby avoiding the danger of ruptured fuel tanks.

These and the other objects and advantages will become more apparent upon reference to the drawings in which.

Figure 1:
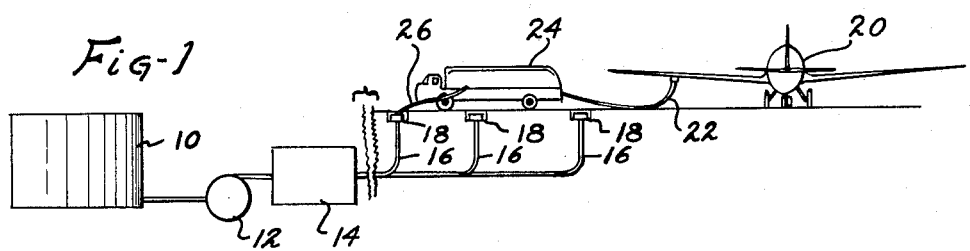
FIGURE 1 is a diagrammatic view showing an airport hydrant system according to my invention.

Referring to the drawings somewhat more in detail in FIGURE 1, 10 illustrates a bulk storage tank for fuel and 12 indicates a pump which draws fuel from the tank and discharges it through metering and filtering means at 14 to a plurality of conduits 16 leading to a plurality of hydrants 18 which, advantageously, are located in pits in the airport.

It will be understood that the conduits 16 in some cases would reach extreme lengths and that the hydrants 18 would usually be relatively widely distributed so that aircraft could be serviced at a number of different plates about the airport.

As will be seen in FIGURE 1 the refueling of an aircraft 20 can be accomplished by connecting dispensing hose 22 to the fuel tank thereof, usually, a wing tank with the hose 22 leading from a refueling or service truck which in turn is connected by a hose 26 with an adjacent one of the hydrants 18.

Figure 2:
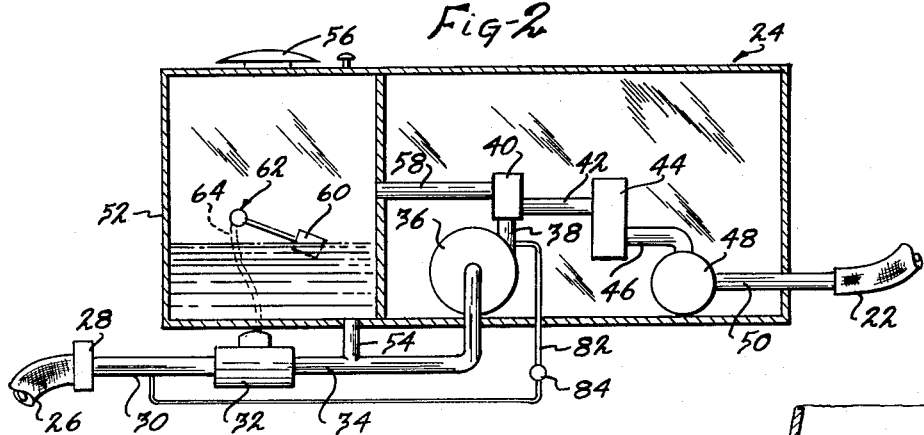
FIGURE 2 is a longitudinal section diagrammatically shown through a refueling truck forming a part of the present invention.

The important component parts of the system that are carried by the service or refueling truck 24 are illustrated in FIGURE 2. In FIGURE 2 it should be noted that hose 26 connects as by way of coupling 28 with a conduit 30 leading to a control valve 32. The discharge side of the control valve 32 is connected by conduit 34 with the inlet of a pump 36. Pump 36 discharges via conduit 38 to a pressure limiting valve 40, the discharge side of which is connected by conduit 42 with the inlet of a filter 44.

The fuel leaving filter 44 passes through a conduit 46 and a meter 48 to a conduit 50 to which the previously mentioned hose 22 is connected.

Figure 3:
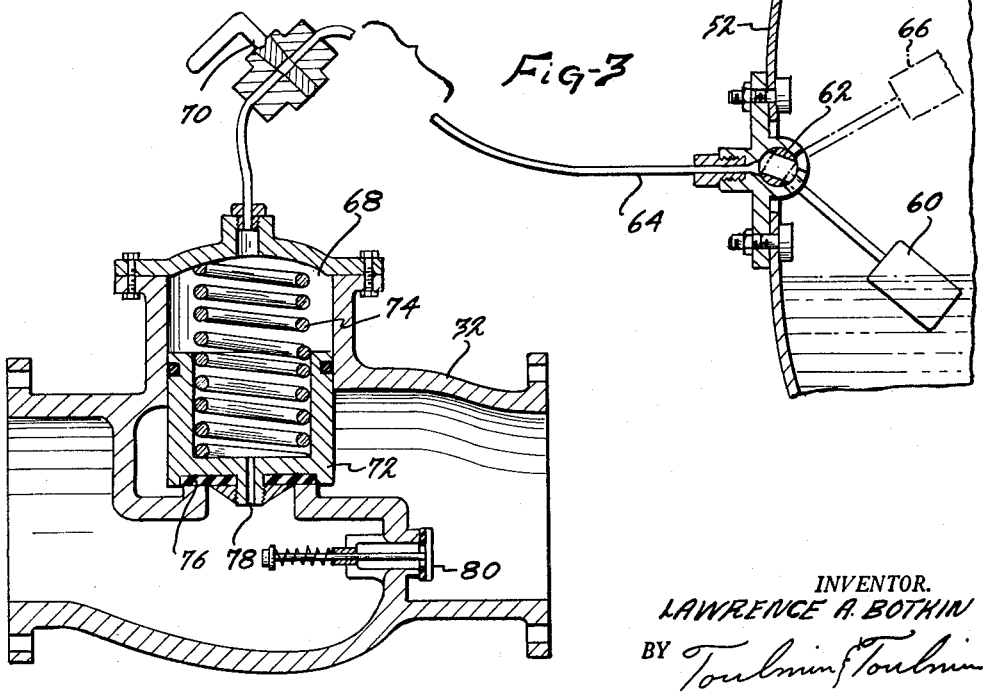
FIGURE 3 is a sectional view showing a control valve forming an important part of the system of this invention.

Conduit 34 is connected between valve 32 and pump 36 to reservoir or tank 52 by a branch 54. The reservoir 52 is preferably vented to the atmosphere as by the vent fitting 56 and is connected by conduit 58 to receive any discharge from the valve 40 produced by over pressure at the inlet side of the valve causing it to open. Reservoir 52 has a float 60 therein which controls a valve 62 which will be seen in FIGURE 3. Valve 62 controls the communication between a pilot conduit 64 and the interior of reservoir 52. As will be seen, the conduit 64 communicates with the interior of the reservoir until the float 60 reaches an upper position as illustrated by the dot-dash outline at 66. When the float reaches this level communication between the conduit 64 and the interior of the reservoir is closed off.

Conduit 64 leads to a pilot chamber 68 of valve 32 and the conduit may contain a manual shut-off valve 70 if so desired which is normally open.

The valve 32 has therein a valve member 72 normally urged by a spring 74 into engagement with the valve seat 76 to close the passage through the valve. Normally, pressure from the inlet end of the valve will lift the valve member off its seat to establish flow through the valve.

However, fluid will pass from the inlet end of the flow passage through the valve through the hole 78 in the valve member into chamber 68. So long as conduit 64 vents freely through valve 64 into reservoir 52, valve member 72 is free to lift and is urged toward closing position only by spring 74. However, when float 66 reaches a position where valve 62 closes, pressure will build up in chamber 68 and force valve member 72 downwardly against its seat. This will interrupt flow through the valve 32 until fluid is removed from reservoir 52 thus permitting float 60 to drop and open valve 62 and vent chamber 68 through conduit 64 and which conduit is substantially larger than hole 78 so that the pressure will drop in chamber 68 and permit valve member 72 to open.

By the arrangement described above the fuel in the reservoir is maintained at a relatively constant level and there is no way for high pressure surges to pass from the hydrant through the service or fueling truck to the dispensing hose 22 and thus to the aircraft fuel tank. The pressure at the inlet of pump 36 is substantially atmospheric at all times. When pump 36 is operating, unless the level in reservoir 52 is high, the pump 36 will receive fluid directly from the outlet of valve 32 and the level within the reservoir will be maintained by modulation of the control valve 32.

Closing of the nozzle in hose 22 to halt the fuel filling operation will bring about operation of the valve 40 to by-pass the discharge from pump 36 so that no high pressure surges are developed in hose 22. Any flow from the hydrant system at this time goes directly to the reservoir 32 through conduit 54 and this also eliminates any pressure surges. As the level rises within the reservoir control valve 32 is modulated to its close position and interrupts the flow of fluid to the pertaining hydrant. The kinetic energy in the moving fuel in the hydrant system is dissipated by blowing off through relief valve 80 forming a part of control valve 32 and this kinetic energy is thus expended with the only result being a somewhat increased level in reservoir 52 which, however, presents no problem because the fuel is withdrawn at the beginning of the next fueling operation before control valve 32 opens.

The system described above is a much improved system over existing hydrant systems which operate with a substantially completely closed hydraulic system and which rely upon the almost instantaneous action of control valves to prevent extremely high surges of pressure from reaching the aircraft piping system. Such systems often fail through failure of the valves to operate sufficiently quickly and thus it occurs that fuel tanks or the like in the aircraft can be ruptured whereas by the use of the present invention the failure of the control valves could only result in overflow of reservoir 52.

The pump 36 and control valve 32 could be by-passed by a conduit 82 having a de-fueling control valve 84 therein for withdrawing fuel from aircraft but this in no way influences the operation of the system of the present invention and would only lead to a rise in the level in reservoir 52 which, as explained above, does not influence the system in any way whatsoever.

It will be understood that this invention is susceptible to modification in order to adapt it to different usages and condition; and, accordingly, it is desired to comprehend such modifications within this invention as may fall within the scope of the appended claims.

I claim:

1. In a fueling system; a hydrant, a first pump spaced from said hydrant to supply fuel thereto, a conduit leading from said pump to the hydrant, and a service unit adapted for connecting said hydrant with a container to be filled, said service unit comprising a reservoir, a control valve having its outlet connected to said reservoir to discharge fuel thereto and its inlet adapted for connection to said hydrant to receive fuel therefrom, float means in the reservoir operatively connected to said control valve and operable at a predetermined maximum liquid level in the reservoir to cause closing of said control valve, a second pump in the service unit having its inlet connected to the reservoir to draw fuel therefrom and having its outlet adapted for connection to said container to deliver fuel to the container, and a relief valve having its inlet connected to the inlet of the control valve and its outlet connected to said reservoir thus bypassing said control valve to relieve pressure surges in said conduit to said reservoir.

2. In a fueling system; a main source of fuel, a first pump connected to draw fuel from said source and to supply the fuel under pressure, a plurality of hydrants spaced from the pump and conduit means leading from the pump to the hydrants, and a mobile service unit adapted for connecting the hydrants to containers to be filled, said service unit comprising a vented reservoir, a control valve having its outlet connected to said reservoir and its inlet adapted for connection to a hydrant, a float in the reservoir, means operated by the float for closing the control valve when the liquid in the reservoir reaches a predetermined maximum level, a second pump in the unit having its inlet connected to the reservoir to draw fuel therefrom and its outlet adapted for connection to said container to supply fuel thereto, a relief valve having its inlet connected to the inlet of the control valve and its outlet connected to said reservoir thus bypassing said control valve, and another relief valve connecting the discharge side of said second pump to the reservoir and opening toward the reservoir.

3. In a fueling system; a hydrant, a first pump spaced for supplying fuel to the hydrant from said hydrant, a conduit leading from said pump to the hydrant, and a service unit adapted for connecting said hydrant with a container to be filled, said service unit comprising a reservoir, a control valve having its outlet connected to said reservoir and its inlet adapted for connection to said hydrant, float means in the reservoir operatively connected to said control valve operable at a predetermined maximum liquid level in the reservoir to cause closing of said control valve, a second pump in the service unit having its inlet connected to the reservoir and having its outlet adapted for connection to said container, a relief valve having its inlet connected to the inlet of the control valve and its outlet connected to said reservoir thus bypassing said control valve to relieve pressure surges in said conduit to said reservoir, said control valve comprising fluid operated means connected to the inlet thereof responsive to fluid pressure to close the valve, and said float means including means for exhausting said fluid operated means to the reservoir until the fluid in the reservoir reaches said predetermined maximum level.

4. In a fueling system; a hydrant, a first pump for supplying fuel to the hydrant spaced from said hydrant, a conduit leading from said pump to the hydrant, and a service unit adapted for connecting said hydrant with a container to be filled, said service unit comprising a reservoir, a control valve having its outlet connected to said reservoir and its inlet adapted for connection to said hydrant, float means in the reservoir operable at a predetermined liquid level therein to cause closing of said control valve, a second pump in the service unit having its inlet connected to the reservoir and having its outlet adapted for connection to said container, a relief valve having its inlet connected to the inlet of the control valve and its outlet connected to said reservoir thus bypassing said control valve to relieve pressure surges in said conduit to said reservoir, said control valve having a valve member, fluid operated means responsive to fluid pressure to close said valve member, a restricted connection from said fluid operated means to the inlet of the valve, a second connection from the fluid operated means to the reservoir operable normally to exhaust said fluid operated means, and means in said second connection responsive to movement of the float in following the fluid in the reservoir to said predetermined maximum level for interrupting said second connection.

5. In a fueling system; a hydrant, a first pump for supplying fuel to the hydrant spaced from said hydrant, a conduit leading from said pump to the hydrant, and a service unit adapted for connecting said hydrant with a container to be filled, said service unit comprising a reservoir, a control valve having its outlet connected to said reservoir and its inlet adapted for connection to said hydrant, float means in the reservoir operable at a predetermined liquid level therein to cause closing of said control valve, a second pump in the service unit having its inlet connected to the reservoir and having its outlet adapted for connection to said container, a relief valve having its inlet connected to the inlet of the control valve and its outlet connected to said reservoir thus bypassing said control valve to relieve pressure surges in said conduit to said reservoir, said control valve having a valve member, fluid operated means responsive to fluid pressure to close said valve member, a restricted connection from said fluid operated means to the inlet of the valve, a second connection from the fluid operated means to the reservoir operable normally to exhaust said fluid operated means, and means in said second connection responsive to movement of the float in following the fluid in the reservoir to said predetermined maximum level for gradually interrupting said second connection.

6. In a fueling system; a hydrant, a first pump spaced from said hydrant, a conduit leading from said pump to the hydrant, and a service unit adapted for connecting said hydrant with a container to be filled, said service unit comprising a reservoir, a control valve having its outlet connected to said reservoir and its inlet adapted for connection to said hydrant, float means in the reservoir operable at a predetermined liquid level therein to cause closing of said control valve, a second pump in the service unit having its inlet connected to the reservoir and having its outlet adapted for connection to said container, and a relief valve bypassing said control valve to relieve pressure surges in said conduit to said reservoir, said control valve having a valve member spring urged toward closed position and urged toward open position by pressure at the inlet of the valve, fluid operated means responsive to fluid pressure to close said valve member, a restricted connection from said fluid operated means to the inlet of the valve, a second connection from the fluid operated means to the reservoir operable normally to exhaust said fluid operated means, and means in said second connection responsive to movement of the float in following the fluid in the reservoir to said predetermined level for gradually interrupting said second connection.

7. A mobile fueling unit adapted for connection between a hydrant and a container such as an aircraft fuel tank to be filled and operable to prevent pressure surges from passing from the hydrant to the container, said unit comprising; a vented reservoir, a pump connected to draw fluid from the reservoir and supply it to said container, a modulating valve having an outlet connected to said reservoir and having an inlet adapted for connection with said hydrant, means sensitive to the liquid level in the reservoir operatively connected with said modulating valve for controlling said modulating valve and operable at a predetermined maximum level of the liquid in the reservoir to close said valve, and a relief valve having its inlet connected to the inlet of the control valve and its outlet connected to said reservoir thus bypassing the modulating valve to dissipate the kinetic energy of the fluid approaching and flowing through the hydrant and to the modulating valve when the modulating valve closes.

8. A mobile fueling unit adapted for connection between a hydrant and a container such as an aircraft fuel tank to be filled and operable to prevent pressure surges from passing from the hydrant to the container, said unit comprising; a vented reservoir, a pump connected to draw fluid from the reservoir and supply it to said container, a modulating valve having an outlet connected to said reservoir and having an inlet adapted for connection with said hydrant, means sensitive to the liquid level in the reservoir operatively connected to said modulating valve for controlling said modulating valve and operable at a predetermined maximum level of the liquid in the reservoir to close said valve, a relief valve having its inlet connected to the inlet of the control valve and its outlet connected to said reservoir thus bypassing the modulating valve to dissipate the kinetic energy of the fluid approaching and flowing through the hydrant and to the modulating valve when the modulating valve closes, there also being a relief valve connected between the discharge side of the pump and the reservoir and opening toward the reservoir.

References Cited in the file of this patent

UNITED STATES PATENTS

| | | |
|---|---|---|
| 2,303,278 | Moody | Dec. 1, 1942 |
| 2,577,682 | Hinds et al. | Dec. 4, 1951 |